US009718317B2

(12) United States Patent
Kendricks

(10) Patent No.: US 9,718,317 B2
(45) Date of Patent: Aug. 1, 2017

(54) SHORT TRAPEZOIDAL WHEEL GASKET

(71) Applicant: GOODRICH CORPORATION, Charlotte, NC (US)

(72) Inventor: Warren Kendricks, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 6 days.

(21) Appl. No.: 14/884,549

(22) Filed: Oct. 15, 2015

(65) Prior Publication Data

US 2017/0108069 A1    Apr. 20, 2017

(51) Int. Cl.
| | | |
|---|---|---|
| *B60C 23/18* | (2006.01) | |
| *B60B 27/00* | (2006.01) | |
| *B64C 25/34* | (2006.01) | |
| *F16D 65/78* | (2006.01) | |
| *B60B 25/00* | (2006.01) | |
| *F16D 65/847* | (2006.01) | |

(52) U.S. Cl.
CPC ............ *B60C 23/18* (2013.01); *B60B 25/004* (2013.01); *B60B 27/0047* (2013.01); *B64C 25/34* (2013.01); *F16D 65/78* (2013.01); *F16D 65/847* (2013.01); *B60B 2900/513* (2013.01); *B60Y 2200/51* (2013.01); *F16D 2065/785* (2013.01)

(58) Field of Classification Search
CPC ....... B60C 19/002; B60C 23/18; B60C 23/19; F16D 65/10; B60B 21/12
USPC .......................................... 301/6.1, 6.2, 6.91
See application file for complete search history.

(56) References Cited

U.S. PATENT DOCUMENTS

| | | | |
|---|---|---|---|
| 4,017,123 A | | 4/1977 | Horner et al. |
| 4,084,857 A | * | 4/1978 | VanderVeen ............ B60B 19/10 188/264 G |
| 4,640,330 A | | 2/1987 | Frassica |
| 4,856,619 A | * | 8/1989 | Petersen ................. B64C 25/36 188/18 A |
| 5,002,342 A | * | 3/1991 | Dyko ...................... F16D 65/84 188/264 G |
| 5,199,536 A | * | 4/1993 | Clark ...................... F16D 55/36 188/264 G |
| 5,310,025 A | * | 5/1994 | Anderson ............... F16D 55/36 188/73.37 |
| 5,851,056 A | | 12/1998 | Hyde |
| 6,333,364 B2 | * | 12/2001 | Meguriya .................. C08J 9/32 521/134 |
| 7,527,872 B2 | | 5/2009 | Steele et al. |

(Continued)

FOREIGN PATENT DOCUMENTS

| | | |
|---|---|---|
| EP | 0650562 | 5/1995 |
| EP | 1304240 | 4/2003 |

OTHER PUBLICATIONS

Extended European Search Report dated Mar. 15, 2017 in European Application No. 16194208.1.

*Primary Examiner* — Jason Bellinger
(74) *Attorney, Agent, or Firm* — Snell & Wilmer L.L.P.

(57) ABSTRACT

A wheel assembly in accordance with various embodiments for use with an aircraft can include an inner surface, a first lug extending into an area defined by the inner surface and a heat shield configured to be coupled to the first lug. The wheel assembly can also include a gasket configured to be positioned between the inner surface and the heat shield and to remain in place relative to the first lug in response to rotation of the wheel assembly relative to the aircraft.

16 Claims, 6 Drawing Sheets

(56) References Cited

U.S. PATENT DOCUMENTS

| | | |
|---|---|---|
| 7,546,910 B2 | 6/2009 | Thorp et al. |
| 8,157,062 B2 | 4/2012 | Enright et al. |
| 8,668,276 B2 * | 3/2014 | Hall ........................ B64C 25/36 301/6.1 |
| 9,103,393 B2 | 8/2015 | Houser et al. |
| 2010/0025172 A1 | 2/2010 | Campbell |
| 2011/0190410 A1 * | 8/2011 | Nozoe .................... C08G 77/12 521/122 |

* cited by examiner

SHORT TRAPEZOIDAL WHEEL GASKET

FIELD

The present disclosure is directed to aircraft wheels and, more particularly, to gaskets for use between a heat shield and an inner surface of an aircraft wheel.

BACKGROUND

Some aircraft include one or more landing gear having wheels for supporting the aircraft while the aircraft is not airborne. Many wheels can include a braking system positioned within the wheel to aid in reducing forward velocity of the aircraft during taxi and landing. The braking system can generate relatively large amounts of heat due to the relatively large mass of the aircraft and due to the relatively high velocity of the aircraft upon landing. A heat shield may be positioned between an inner surface of the wheel and the braking system in order to reduce an amount of heat transfer from the braking system to the wheel and a corresponding tire. The heat shield can occasionally contact the inner surface of the wheel during taxi, takeoff and landing, which may be undesirable. Thus, it is desirable to reduce the opportunity for contact between the heat shield and the inner surface of the wheel.

SUMMARY

A wheel assembly in accordance with various embodiments for use with an aircraft can include an inner surface, a first lug extending into an area defined by the inner surface and a heat shield configured to be coupled to the first lug. The wheel assembly can also include a gasket configured to be positioned between the inner surface and the heat shield and to remain in place relative to the first lug in response to rotation of the wheel assembly relative to the aircraft.

In the foregoing wheel assembly, the gasket can have a first end and a second end and taper from the first end to the second end.

In any of the foregoing wheel assemblies, the gasket can be rectangular in shape.

In any of the foregoing wheel assemblies, the gasket can define a first gasket aperture.

Any of the foregoing wheel assemblies can also include a fastener and heat shield can define a first shield aperture. The fastener can extend through the first shield aperture of the heat shield and through the first gasket aperture and be received by the first lug.

Any of the foregoing wheel assemblies can also include an insert defining an insert slot configured to receive the fastener prior to the fastener extending through the first shield aperture.

Any of the foregoing wheel assemblies can also include a second lug extending into the area defined by the inner surface. The heat shield can define a second shield aperture and the gasket can a second gasket aperture configured to be aligned with the second lug and the second shield aperture.

In any of the foregoing wheel assemblies, the gasket can reduce an amount of contact between the heat shield and the inner surface.

In any of the foregoing wheel assemblies, the area defined by the inner surface can receive a braking system and the heat shield can reduce heat transfer from the braking system to the inner surface.

In any of the foregoing wheel assemblies, the gasket can include a silicone rubber and be resistant to temperatures up to 500 degrees Fahrenheit (260 degrees Celcius).

A system in accordance with various embodiments for reducing an amount of heat received by a wheel assembly of an aircraft includes a heat shield having a first shield aperture and configured to be coupled to an inner surface of the wheel assembly. The system also includes a gasket having a first end, a second end, and a body tapering from the first end to the second end. The body defines a first gasket aperture configured to align with a first lug of the wheel assembly and the first shield aperture of a heat shield. The gasket is configured to reduce contact between the inner surface and the heat shield.

In the foregoing system, the body can include a silicone rubber and be resistant to temperatures up to 500 degrees Fahrenheit (260 degrees Celcius).

In any of the foregoing systems, the body can be coupled to the inner surface and the heat shield via a fastener extending through the first shield aperture and the first gasket aperture and being received by the first lug.

In any of the foregoing systems, the fastener can also extend through an insert prior to extending through the first shield aperture and the first gasket aperture.

In any of the foregoing systems, the body can also define a second gasket aperture to be align with a second shield aperture of the heat shield and a second lug of the wheel assembly.

A landing gear of an aircraft in accordance with various embodiments includes an outer wheel assembly and an inner wheel assembly. The inner wheel assembly includes an inner surface, a first lug extending into an area defined by the inner surface and a heat shield configured to be coupled to the first lug. The inner wheel assembly further includes a gasket configured to be positioned between the inner surface and the heat shield and to remain in place relative to the first lug in response to rotation of the wheel assembly relative to the aircraft.

In the foregoing landing gear, the gasket can have a first end and a second end and tapers from the first end to the second end.

In any of the foregoing landing gears, the gasket can be rectangular in shape.

In any of the foregoing landing gears, the gasket can define a first gasket aperture.

In any of the foregoing landing gears, the wheel assembly can also include a fastener, the heat shield can define a first shield aperture and the fastener can extend through the first shield aperture of the heat shield and through the first gasket aperture and be received by the first lug.

The forgoing features and elements may be combined in various combinations without exclusivity, unless expressly indicated herein otherwise. These features and, elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
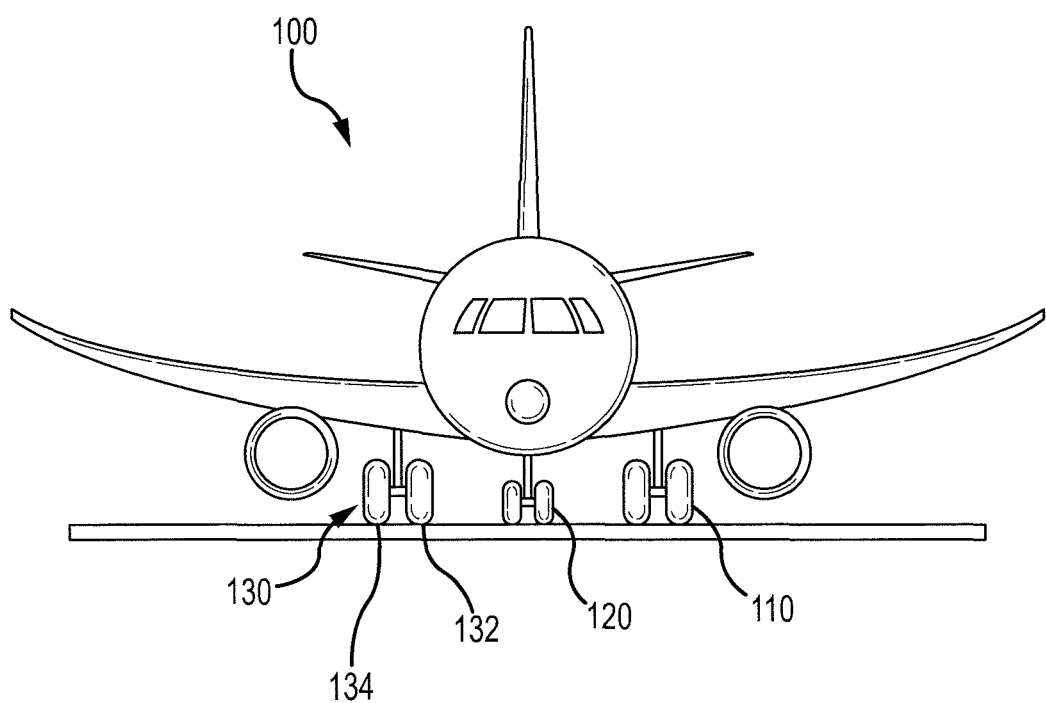
FIG. 1 is a drawing of an aircraft having landing gear, in accordance with various embodiments.
Figure 2A:
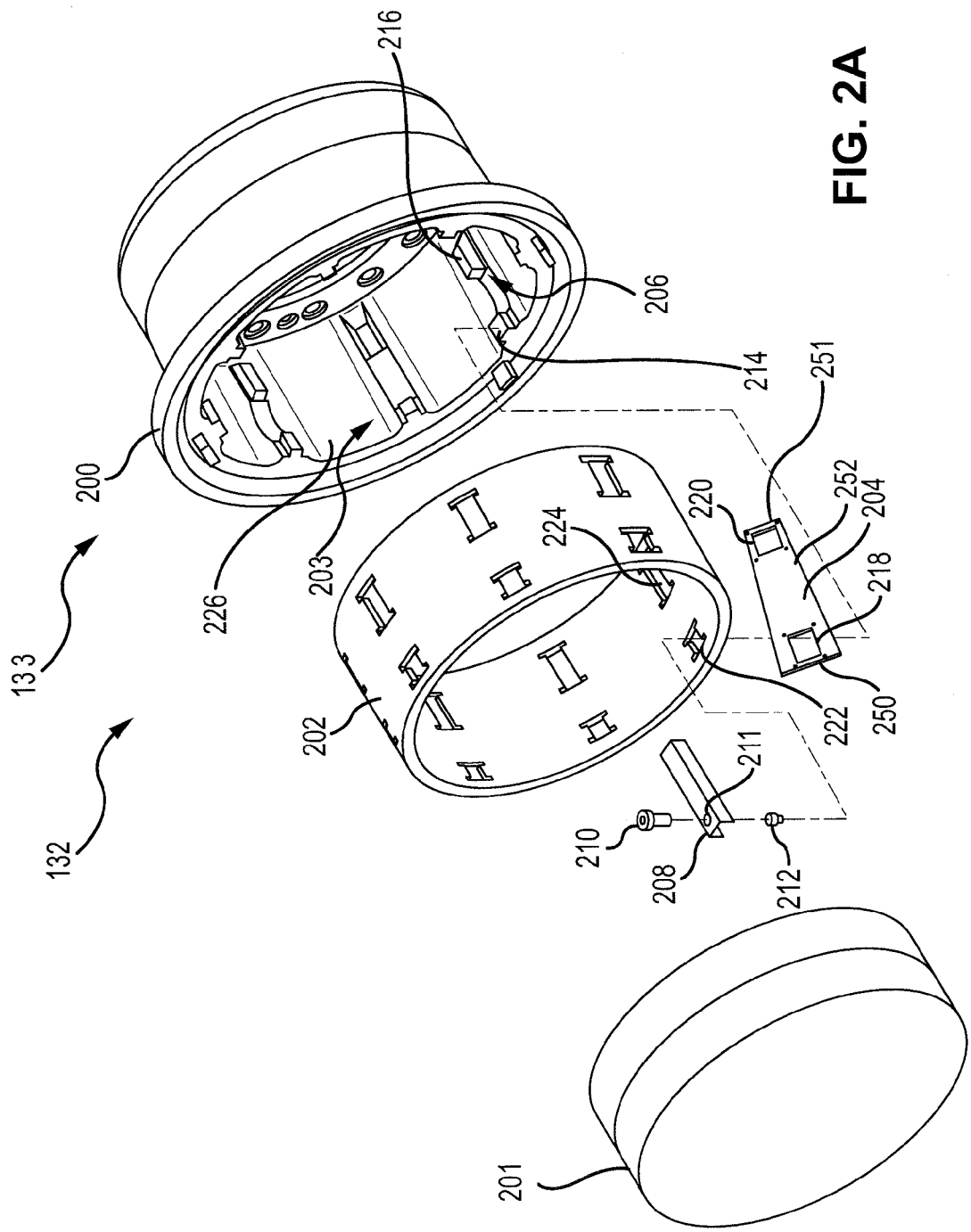
FIG. 2A is an exploded view of a wheel of the aircraft of FIG. 1, in accordance with various embodiments.
Figure 2B:
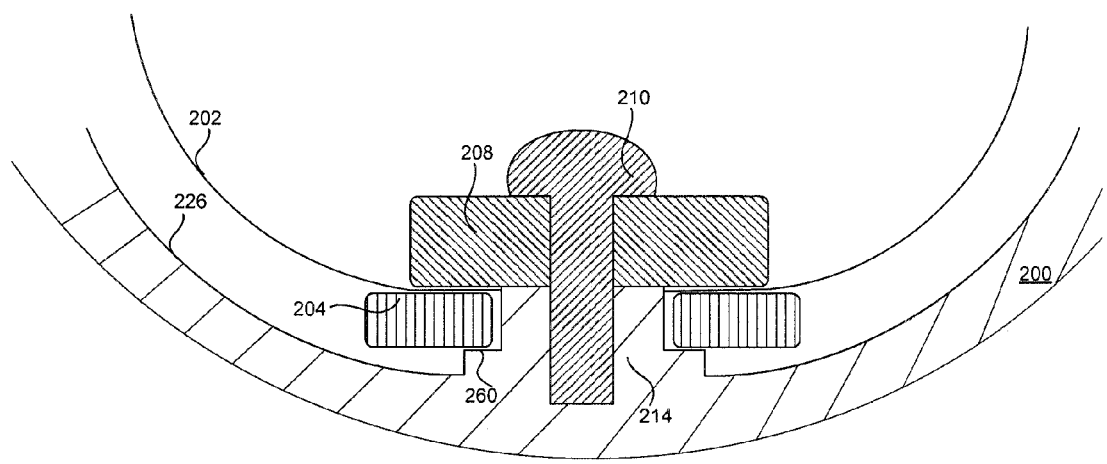
FIG. 2B is an enlarged cross-sectional view of the wheel of FIG. 2A, in accordance with various embodiments.

Referring now to FIG. 1, an aircraft 100 in accordance with various embodiments can include multiple landing gear including landing gear 110, landing 120 and landing gear 130. Each landing gear may include one or more wheel assemblies. For example, the landing gear 130 includes an inner wheel assembly 132 and an outer wheel assembly 134. The inner wheel assembly 132 and the outer wheel assembly 134, along with the other wheels of the aircraft 100, can include a disk braking system that provides a braking force to the corresponding wheel. The braking system may be partially positioned within an area defined by a wheel, such as an area 203 of FIG. 2A defined by the inner wheel assembly 132. Each braking system can generate a relatively large amount of heat (e.g., resulting in brake temperatures of up to 500 degrees Fahrenheit (500° F., 260 degrees Celsius (260° C.)) due to the relatively high velocity of the aircraft 100 upon landing and due to the relatively large mass of the aircraft 100.

Each wheel of the aircraft 100 can receive a tire. For example, a tire may be placed about an outer circumference of the inner wheel assembly 132 and inflated. It is desirable to prevent the heat from the corresponding braking system to transfer to the wheel and the tire, as the heat may stress the wheel and the tire.

With reference now to FIGS. 2A, 2B, 3 and 4, inner wheel assembly 132 can include a wheel 133 having an inner wheel half 200 and an outer wheel half (not shown), a braking system 201, a heat shield 202 and a gasket 204. The heat shield 202 may be positioned within an area 203 defined by the inner wheel half 200 of the wheel 133 and coupled to the inner wheel half 200. In some embodiments, the heat shield 202 comprises a continuous piece of material. However, in various embodiments, a heat shield can comprise two or more pieces that can be coupled together to form the heat shield.

When coupled to the inner wheel half 200, the heat shield 202 is positioned between the inner wheel half 200 and the braking system 201 and may reduce an amount of heat transferred from the braking system 201 to the inner wheel half 200. Thus, when the inner wheel assembly 132 is assembled and coupled to a tire, the heat shield 202 reduces an amount of heat that transfers to the inner wheel assembly 132, and thus the tire, from the braking system 201.

The inner wheel half 200 includes a plurality of pairs of lugs including a pair of lugs 206. The pair of lugs 206 can include a first lug 214 and a second lug 216 and can extend radially inward from an inner surface 226 of the inner wheel half 200. The pair of lugs 206 is used to couple the heat shield 202 to the inner wheel half 200. The heat shield 202 includes a plurality of shield apertures including a first shield aperture 222 and a second shield aperture 224 for enabling coupling of the heat shield 202 to the inner wheel half 200.

In order to couple the heat shield 202 to the inner wheel half 200, the first shield aperture 222 is aligned with the first lug 214 and the second shield aperture 224 is aligned with the second lug 216. In various embodiments, an insert 208 may be positioned over the first shield aperture 222 and the second shield aperture 224. A fastener 210 can extend through an insert slot 211 of the insert 208, through the first shield aperture 222 and into a bolt slot 300 (shown in FIG. 3) of the first lug 214. In various embodiments, the fastener 210 can be a bolt, a screw, a rivet or the like. In various embodiments, a washer 212 may be positioned on an opposite side of the insert 208 that the fastener is received from and may receive the fastener 210. Additional fasteners may be inserted through additional shield apertures of the heat shield 202 and into additional bolt slots of each lug of the inner wheel half 200. When all the fasteners are positioned within the bolt slots and fastened, the heat shield 202 is coupled to the inner wheel half 200.

When the heat shield 202 is coupled to the inner wheel half 200 as described above, the heat shield 202 may move in an axial and circumferential direction relative to the inner wheel half 200 during rotation of the inner wheel assembly 132 relative to the aircraft 100 of FIG. 1. The heat shield 202 may contact the inner surface 226 of the inner wheel half 200 in response to this movement. The contact may typically occur within one inch (2.54 centimeters (2.54 cm)) or within one-half inch (1.27 cm) of the first lug 214 and/or the second lug 216. The contact between the heat shield 202 and the inner wheel half 200 can cause abrasion of the inner surface 226 of the inner wheel half 200. Over time, this abrasion may undesirably reduce the tensile strength and thickness of the inner wheel half 200.

In order to reduce the likelihood of abrasion, a gasket 204 may be positioned between the heat shield 202 and the inner surface 226 of the inner wheel half 200 at an area in which contact may occur between the heat shield 202 and the inner surface 226. In that regard, the heat shield 202 can make contact with the gasket 204 instead of the inner surface 226 in response to movement of the aircraft 100 of FIG. 1. This reduces the likelihood of the heat shield 202 contacting the inner surface 226, also reducing the likelihood of abrasion of the inner wheel half 200 by the heat shield 202.

The gasket 204 may have a first gasket aperture 218 and a second gasket aperture 220 that align with the first shield aperture 222 and the second shield aperture 224 of the heat shield 202 and the pair of lugs 206 of the inner wheel half 200. During installation, the gasket 204 may be positioned between the pair of lugs 206 and the first shield aperture 222 and the second shield aperture 224. The first lug 214 can be positioned within the first gasket aperture 218 and the second lug 216 can be positioned within the second gasket aperture 220. The fastener 210 may extend through the first shield aperture 222 and the first gasket aperture 218 and be received by the bolt slot 300, into which it may be fastened.

In various embodiments, the inner wheel half 200 includes a landing 260 extending radially inward from the inner surface 226 and positioned about the first lug 214 and/or the second lug 216. The landing 260 may provide a surface on which the gasket 204 can rest. The gasket 204 may fit snugly about the first lug 214 and/or the second lug 216 such that it resists circumferential and axial movement relative to the inner wheel half 202.

In response to the fastener 210 being received by and fastened to the bolt slot 300, the gasket 204 may be in contact with and squeezed between the landing 260 and the heat shield 202. Stated differently, the gasket 204 may be constricted between the landing 260 and the heat shield 202 such that the gasket 204 resists radial movement relative to the inner wheel half 200. Friction between the gasket 204 and the landing 260 and between the gasket 204 and the heat shield 202 may cause the gasket 204 to resist axial and circumferential movement relative to the inner wheel half 200. It should be noted that the landing 260 is an optional feature. In embodiments without the landing 260, the gasket 204 may be positioned directly between the heat shield 202 and the inner surface 226 of the wheel half 200.

Thus, the gasket 204 may resist movement relative to the inner wheel half 200 in all directions due to the snug fit of the gasket 204 about the first lug 214 and/or the second lug 216 and due to being squeezed between the landing 260 and the heat shield 202. The gasket 204 resists this movement even when the heat shield 202 moves relative to the inner wheel half 200. Thus, the likelihood of abrasion of the inner surface 226 is reduced when the gasket 204 is operatively coupled to the wheel 133.

The gasket 204 can be fabricated from a material having predetermined properties. For example, it is desirable for the material of the gasket 204 to be resistant to temperatures at or below 500° F. (260° C.). Stated differently, it is desirable for the properties of the gasket 204 (such as tensile strength, hardness or the like) to remain substantially stable as its temperature approaches 500° F. (260° C.). For example, it is desirable for the tensile strength and/or the hardness of the material to not vary by more than 10 percent (10%), or 25%, as the temperature of the material changes between 50° F. (10° C.) and 500° F. (260° C.).

It is also desirable for the hardness of the material of the gasket 204 to be between 60 and 90 using the Shore A, or Type A, durometer scale. In various embodiments, it is desirable for the hardness of the material of the gasket 204 to be between 70 and 80 on the Shore A durometer scale. Where used herein, hardness may refer to a material's resistance to permanent indentation.

The thickness of the gasket 204 can be between 0.01 inches (0.254 millimeters) and 0.1 inches (2.54 millimeters). In various embodiments, the thickness may be between 0.03 inches (0.762 millimeters) and 0.045 inches (1.143 millimeters). In various embodiments, the material of the gasket 204 may include a silicone that falls within the SAE specification AMS7267. SAE specification AMS7267 materials can include a silicone rubber designed for use at temperatures between −85° F. (−65° C.) and 500° F. (260° C.).

Figure 3:
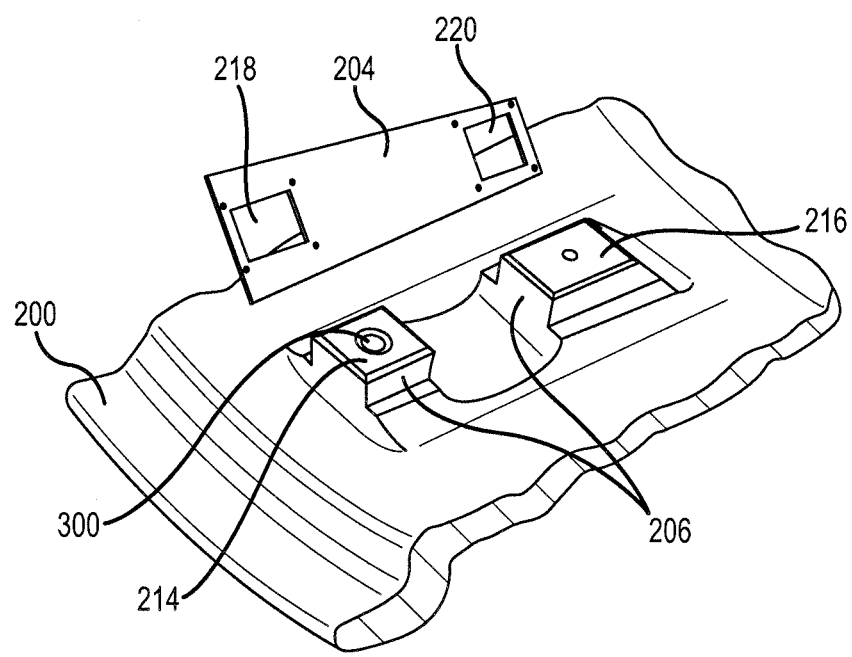
FIG. 3 shows an enlarged view of a pair of lugs and a gasket of the wheel of FIG. 2A, in accordance with various embodiments.
Figure 4:
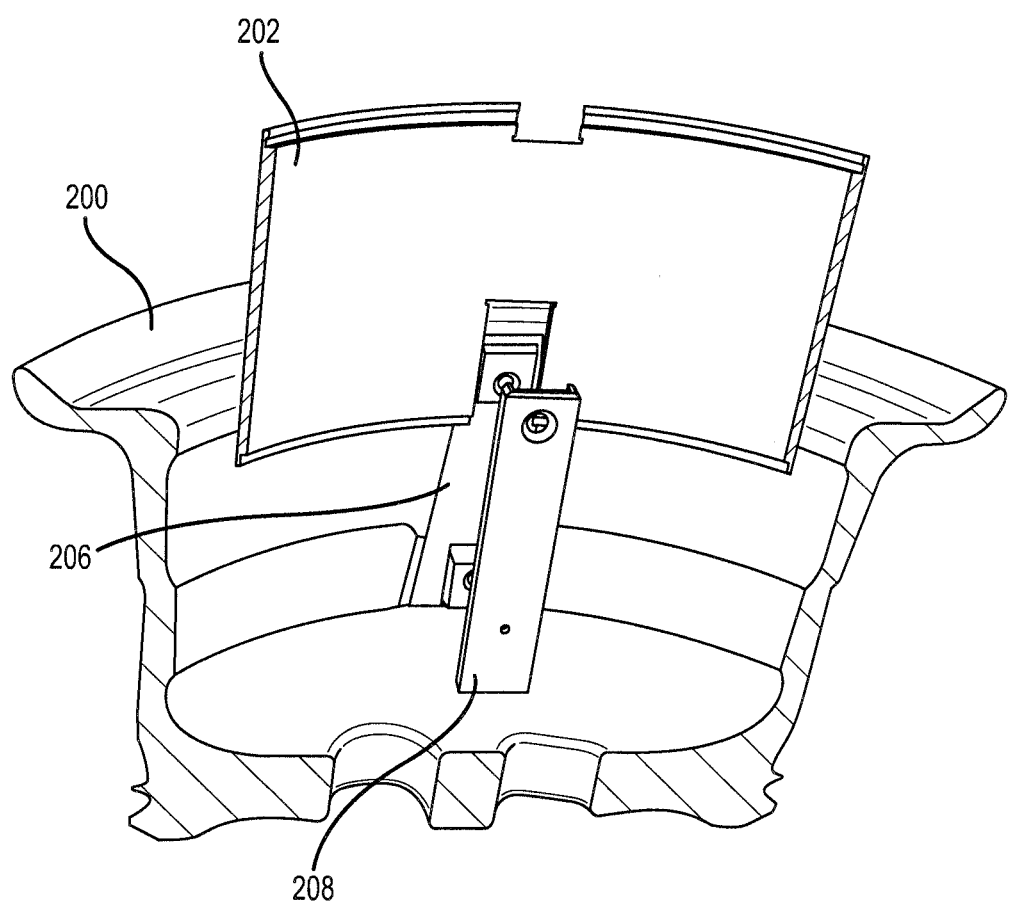
FIG. 4 is a perspective view of a portion of the wheel of FIG. 2A, in accordance with various embodiments.

The gasket 204 can have a trapezoidal shape as shown in FIGS. 2, 3, 4. Stated differently, the gasket 204 can have a body 252, a first end 250 and a second end 251. The body 252 can taper from the first end 250 to the second end 251. The body 252 of the gasket 204 can be positioned adjacent the area of the inner surface 226 of the inner wheel half 200 that the heat shield 202 typically contacts during movement of the aircraft 100 of FIG. 1. Because the area of the inner surface 226 that is prone to contact with the heat shield 202 is trapezoidal, the gasket 204 is effective in reducing the likelihood of abrasion and includes a smaller area and volume than a rectangular gasket. In that regard, use of a trapezoidal gasket, such as the gasket 204, provides advantages such as a reduced weight relative to other potential gasket shapes.

Figure 5:
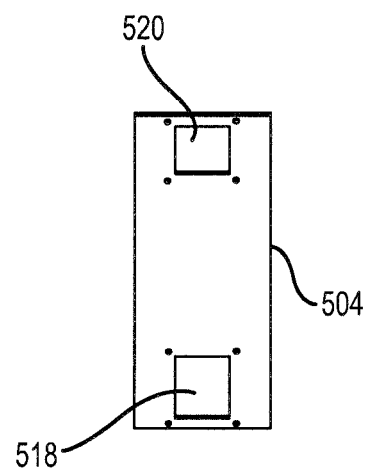
FIG. 5 is a drawing of a gasket to be used between a heat shield and an inner surface of a wheel of an aircraft, in accordance with various embodiments.

However, in various embodiments and with reference to FIGS. 2 and 5, a gasket 504 having a rectangular shape may be used in place of the gasket 204 having the trapezoidal shape. The gasket 504 includes a first gasket aperture 518 that can be aligned with the first shield aperture 222 and the first lug 214. The gasket 504 also includes a second gasket aperture 520 that can be aligned with the second shield aperture 224 and the second lug 216.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel assembly for use with an aircraft, comprising:
   a wheel having:
      an inner surface, and
      a first lug extending radially inward from the inner surface;
   a heat shield defining a first shield aperture and configured to be coupled to the first lug;
   a gasket defining a first gasket aperture and configured to be positioned between the inner surface and the heat shield and to resist movement relative to the wheel in response to rotation of the wheel relative to the aircraft;
   a fastener configured to extend through the first shield aperture of the heat shield and through the first gasket aperture and to be received by the first lug; and
   an insert defining an insert slot configured to receive the fastener prior to the fastener extending through the first shield aperture.

2. The wheel assembly of claim 1, wherein the gasket has a first end and a second end and tapers from the first end to the second end.

3. The wheel assembly of claim 1, wherein the gasket is rectangular in shape.

4. The wheel assembly of claim 1, further comprising a second lug extending radially inward from the inner surface and wherein the heat shield defines a second shield aperture and the gasket further defines a second gasket aperture configured to be aligned with the second lug and the second shield aperture.

5. The wheel assembly of claim 1, wherein the wheel further includes a landing at least partially positioned adjacent to a circumference of the first lug and extending radially inward from the inner surface and the gasket is configured to be positioned between the landing and the heat shield.

6. The wheel assembly of claim 1, wherein the wheel is configured to receive a braking system and the heat shield is configured to reduce heat transfer from the braking system to the inner surface.

7. The wheel assembly of claim 1, wherein the gasket comprises a silicone rubber and is resistant to temperatures up to 500 degrees Fahrenheit (260 degrees Celcius).

8. A system for reducing an amount of heat received by a wheel of an aircraft, comprising:
   a heat shield having a first shield aperture and a second shield aperture and configured to be coupled to an inner surface of the wheel; and
   a gasket having:
      a first end,
      a second end, and
      a body tapering from the first end to the second end and defining a first gasket aperture configured to align with a first lug of the wheel and the first shield aperture of the heat shield and a second gasket aperture configured to align with a second lug of the wheel and the second shield aperture of the heat shield, the gasket configured to reduce contact between the inner surface of the wheel and the heat shield.

9. The system of claim 8, wherein the body comprises a silicone rubber and is resistant to temperatures up to 500 degrees Fahrenheit (260 degrees Celcius).

10. The system of claim 8, wherein the body is configured to be coupled to the inner surface and the heat shield by a fastener extending through the first shield aperture and the first gasket aperture and being received by the first lug.

11. The system of claim 10, wherein the fastener further extends through an insert prior to extending through the first shield aperture and the first gasket aperture.

12. A wheel assembly for use with an aircraft, comprising:
    a wheel having:
       an inner surface,
       a first lug extending radially inward from the inner surface, and
       a second lug extending radially inward from the inner surface;
    a heat shield defining a first shield aperture and a second shield aperture and configured to be coupled to the first lug; and
    a gasket defining a first gasket aperture and configured to be positioned between the inner surface and the heat shield and to resist movement relative to the first lug in response to rotation of the inner wheel assembly relative to the aircraft and a second gasket aperture configured to be aligned with the second lug and the second shield aperture.

13. The wheel assembly of claim 12, wherein the gasket has a first end and a second end and tapers from the first end to the second end.

14. The wheel assembly of claim 12, wherein the gasket is rectangular in shape.

15. The wheel assembly of claim 12, wherein the wheel further includes a landing at least partially positioned adjacent to a circumference of the first lug and extending radially inward from the inner surface and the gasket is configured to be positioned between the landing and the heat shield.

16. The wheel assembly of claim 15, further comprising a fastener configured to extend through the first shield aperture of the heat shield and through the first gasket aperture and to be received by the first lug.

* * * * *